United States Patent [19]

Cassagne

[11] 3,755,623

[45] Aug. 28, 1973

[54] COMBINED TELEVISION CAMERA AND A TELEVISION RECEIVER UNIT

[75] Inventor: Pierre Cassagne, Rueil, France

[73] Assignee: Engins Matra, Paris, France

[22] Filed: Oct. 19, 1971

[21] Appl. No.: 190,513

[30] Foreign Application Priority Data

Oct. 22, 1970 France .............................. 7038142

[52] U.S. Cl. ............. 178/7.89, 178/7.85, 179/2 TV

[51] Int. Cl. ......................... H04n 5/26, H04n 5/655

[58] Field of Search ...................... 178/DIG. 1, 7.85, 178/7.88, 7.89; 179/2 TV

[56] References Cited

UNITED STATES PATENTS

| | | | |
|---|---|---|---|
| 3,525,807 | 8/1970 | Herriott | 179/2 TV |
| 2,420,198 | 5/1947 | Rosenthal | 179/2 TV |
| 3,437,753 | 4/1969 | Stith | 178/DIG. 1 |
| 3,567,848 | 3/1971 | Thies | 179/2 TV |

FOREIGN PATENTS OR APPLICATIONS

| | | | |
|---|---|---|---|
| 1,916,006 | 10/1970 | Germany | 179/2 TV |

*Primary Examiner*—Howard W. Britton
*Attorney*—Hane, Baxley et al.

[57] ABSTRACT

A combined television camera and receiver unit for transmitting and receiving images to and from a similar unit located at a distance therefrom.

The unit is housed in a case which is pivotally mounted on a base and fixed to a support. The television camera is capable of shooting along two substantially perpendicular directions. In a first direction the television camera transmits the image of the first party to the second party and in the other direction the camera transmits the image of a document to the second party. A semi-reflecting plate acts an optical switching means enabling the camera to shoot in each of the two directions. The camera is preferably mounted parallel or perpendicular to the picture tube depending whether or not a mirror is used.

7 Claims, 4 Drawing Figures

PATENTED AUG 28 1973 3,755,623

INVENTOR
PIERRE CASSAGNE
BY Kane, Dalsimer, Kane, Sullivan and Kurucz
ATTORNEYS

COMBINED TELEVISION CAMERA AND A TELEVISION RECEIVER UNIT

The invention relates to a combined television camera and television receiver unit.

For enabling two people to communicate at a distance, it has been proposed to provide each person with a set which comprises a cathode-ray tube on the screen of which is formed the image of the other person, or correspondent party, and a television camera by which the image of the first party is transmitted to the correspondent party.

The television and the cathode-ray tube are necessarily spatially distinct, and the user, therefore, has a tendancy to direct his eyes at the screen of the tube in order to watch the correcpondent party, and not towards the camera. As for the correspondent party, he receives the images provided by the camera, the user is not seen with his eyes turned towards him, contrary to that which is usual in conversation between two parties in the presence of one other. This effect may bother one or both of the parties.

On the other hand the user looking at the image of his correspondent party on the screen of the cathode-ray tube may move laterally while watching this image to the point of leaving the field of vision of the camera without being aware of it other than by a remark made by the correspondent party.

Further, in such known combined sets, it is difficult to solve the problem of maintaining a good visibility of the image provided by the cathode-ray tube when the background lighting is great, for example when the unit is located in a sunny room.

Finally, it is often desired to be able to transmit to one's correspondent not only one's own image but also that of a document; assuring the readability of such a document poses a difficult problem.

The combined set according to the invention provides in a simple manner a solution to these various problems. The invention consists in a combined television camera and receiver unit comprising a case housing a camera and a cathode-ray tube as well as a semi-reflecting plate disposed so that from the exterior of the case the axis or central line of vision of the screen coincides with the axis along which the camera takes pictures.

The spatial separation between the camera and the cathode-ray tube is thus effected without any problem: the user looking at the screen of the tube is placed in the best position for being watched by the correspondent party to whom the picture taken by the television camera is transmitted.

In the arrangement according to the invention not only do the operating axis of the camera and the viewing axis of the screen from outside the unit coincide but substantially so do the optical fields such that in order to be in the best position to watch one's correspondent party, the user naturally places himself in the best picture-taking position.

According to an embodiment, the case is substantially parallelpiped with opaques walls except for a transparent portion for the passage of the light rays, and the cathode-ray tube is placed in a portion of the casing opposite the portion including the transparent portion. The cathode-ray tube is thus protecte to a significant extent from the effect of strong background light.

The use of a semi-reflecting plate also reduces the effect of the background light, the background light passing through the plate twice, whereas the light energy coming from the projection of the television picture on the screen of the cathode-ray tube only passes through it once.

The invention also aims at an embodiment according to which it comprises not only a transparent portion for the user to view the television picture formed on the screen of the cathode-ray tube and the transmission of the image of the user by the camera, but also another transparent portion for the transmission by the camera of images of documents placed in a position such that their readability by the correspondent party is assured.

The description which follows, made by way of example, refers to the accompanying drawing, in which.

Figures 1, 2, 3, 4:
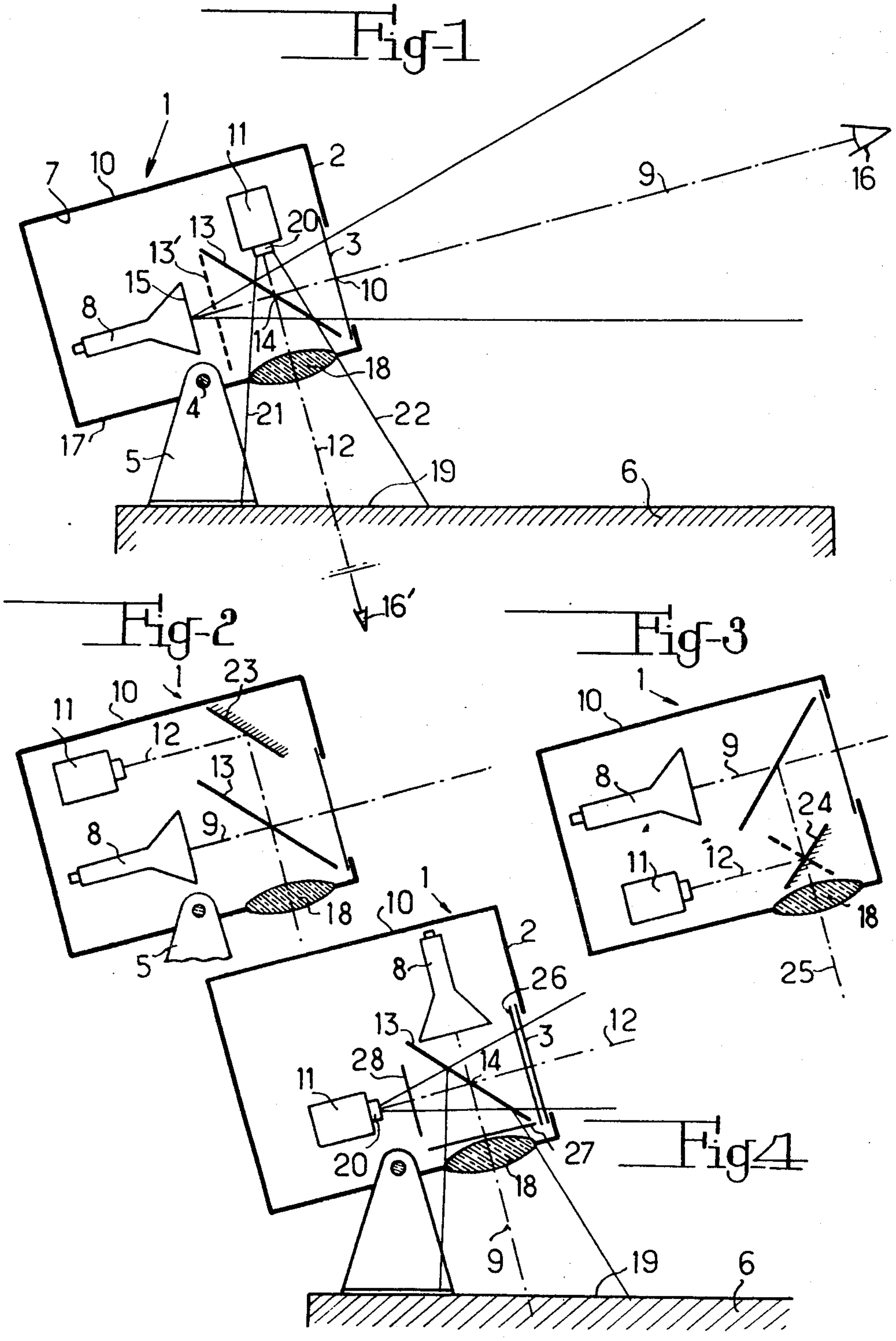
FIG. 1 is a schematic view an embodiment of a combined set according to the invention.
FIG. 2 is a view analogous to FIG. 1 but for another embodiment.
FIG. 3 is a view analogous to the preceding figures but for an alternative embodiment.
FIG. 4 is a view analogous to the preceding figures for still another embodiment.

Reference will first be made to FIG. 1. The set comprises a case 1, generally of parallelpiped shape with a transparent wall 3 on its front face 2. The case is for example, pivotally supported about a pin 4 on a base 5 which in turn rests on a table 6 or the like.

Inside the case 1 having a interior surface which is advantageously black, a cathode-ray tube 8 is arranged opposite the transparent portion. The axis of the cahtode-ray tube 9 is perpendicular to the front face 2 and passes substantially through the centre 10 of the transparent portion 3.

In the vicinity of the corner of the case formed by the upper wall 10 and the front wall 2 is located a television camera 11 whose axis is perpendicular to the axis 9. A semi-reflecting plate 13 is disposed inside the case 1 at 45° relative to the axes 9 and 12 and passes through the intersection 14 of the axes 9 and 12.

Means, known per se, enable the formation of the image of the correspondent party on the screen 15 of the cathode-ray tube 8,—the correspondent party being placed in front of a combined unit similar to that which has just been described and at at distance therefrom—, and also the projection on the screen of the picture tube of the correspondent party's unit of images provided by the camera 11.

The user of the described unit, represented by his schematized eye 16, placed in front of the transparent wall 3 is able to watch the screen 15 when substantially in line along the axis 9 of the cathode-ray tube 8.

The screen 15 of the tube 8 is in a portion of the case remote from the screen 3 which avoids to a great extent the direct action of the background light on the screen 15. Further, the background light which passes through the transparent wall 3 and which is reflected by the screen 15 only reaches the user after passing through the semi-reflecting plate 13 twice, the attentuation thus being considerably greater than that of the light energy coming directly from the screen 15 which passes through the semi-reflecting plate 13 only once. The bothersome effect of a bright light background which may exist in the room where the combined unit is located is thus minimized.

By means of the semi-reflecting plate 13, the viewer is located for the camera 11 as if he were, in fact, located along the axis of the camera, as schematized by the image 16' of the eye 16, therefore, the correspondent party will be in the best position for conversing with the user when watching the correspondent party on the screen 15; the user is in a position in which the camera "sees" his eyes turned towards it such that the correspondent party and the user are by means of the television in a face-to-face position which is that of two conversing parties in the presence of one another.

Further, in order to be able to satisfactorily watch the image formed on the screen 15, the user naturally puts himself along the central line of the optical field of the picture tube 8 which coincide with the centre line position of the optical field associated with the camera 11. He does not therefore risk leaving the filed involuntarily.

In the present device the lower wall 17 of the case 1 has a lens 18 or the like in its portion facing the camera 11 such that for the camera a document placed in the zone 19 on the table in the filed of the camera 11 is in a favourable optical position for good television transmission without the focus of the camera having to be changed.

Means are provided for moving the semi-reflecting plate from the position shown in solid lines where it is at 45° relatives to axes 9 and 12 and to a position such as shown at 13 where it is outside the field of the camera which is schematically shown by its limits 21 and 22 and which enables the correspondent party to read more easily the document placed in the zone 19 on the table 6.

Means may be provided for intensely lighting the document placed on the table in the field of the camera when its image is to be transmitted by television.

Reference will now be made to FIG. 2. In this embodiment the camera 11 is placed above the cathode-ray tube 8 with its axis 12 parallel to the axis of the tube, and a plane mirror 23 positioned at 45° from the axis 12 enables the picture-taking along the axis 9.

In the alternative embodiment shown in FIG. 3, the cathode-ray tube 8 is located in the upper part of the case and the camera 11 is positioned in the lower part. The axis 12 of the camera 11 is parallel to the axis 9 of the tube 8, and a mirror 24 enables picture-taking along the axis 9 of the camera.

In order to take the picture of a document placed along the axis 25 of the lens 18, the mirror 24 is brought into the position shown in chain-dotted lines at 90° from its position for taking picture along the axis 9.

Reference will now be made to FIG. 4. In this embodiment the camera 11 has its axis substantially perpendicular to the transparent portion 3 and passes through the centre thereof. The cathode-ray tube 8 is placed in the vicinity of the corner formed by the upper wall 10 and the forward wall 2 with its axis perpendicular to the axis 12. A semi-reflecting plate 13 passes through the point of intersection 14 of the axis 9 and the axis 12 and is at 45° thereto. A first polarizing filtre 26 is placed behind the transparent portion 3 and a second polarizing filtre 27 is placed behind the lens 18, the planes of polarization of the filtres being at 90° from each other.

A third polarizing filtre 28 is placed in front of the lens 20 of the camera 11 and is mounted for rotation about its axis, coinciding with the axis 12. In one position the filtre 28 allows the passage of the light having passed through the transparent wall 3 and the filtre 26, but opposes the passage of the light having passed through the lens 18 and the filtre 27; in this condition, the camera 11 transmits the image of the user to the correspondent. In another position of the filtre 28, 90° from the first position, the filtre 28 allows the passage of light having passed through the lens 18 and the filtre 27 but opposes the passage of the light having passed through the transparent portion 3 and the filtre 26; this is the position in which the correspondent party sees the image of the document placed in the zone 19 on the table 16.

What is claimed is:

1. Television apparatus comprising: a casing, said casing including a front face having a first observation opening and a lower face transverse to the front face, said lower face having a second observation opening with an axis perpendicular to the axis of said first observation opening; a lens fitted into said second observation opening; a partially reflecting slide within said casing; said partially reflecting slide transversing the intersection of said two axes and equally inclined relative to said axes; means for television picture taking operative along one of said axes; and means for forming images operative along the other of said axes.

2. Television apparatus according to claim 1, comprising beyond said partially reflecting slide relative to the second observation opening a mirror inclined at 45° relative to the axis of said second opening and said means for television picture taking in alignment with an axis perpendicular to said axis of the second observation opening and transversing the intersection of the latter with said inclined mirror.

3. Television apparatus according to claim 1, wherein said first opening is provided with a rectilinear polarizing filter and the second opening is provided with a second rectilinear filter polarizing in a direction perpendicular to the first direction and said means for taking a television picture comprises a polarizing filter rotatively mounted around the axis of said means for taking a television picture.

4. Television apparatus according to claim 1, wherein said means for television picture taking is in alignment with the axis of the second opening.

5. Television apparatus according to claim 4, wherein said partially reflecting slide is mounted so as to be adjusted to be perpendicular to the axis of the means for forming television images.

6. Television apparatus comprising: a substantially parallelepiped-like casing having a front face with a first observation opening; a cathode-ray tube behind said first observation opening within said casing, said cathode-ray tube having an axis which coincides with the axis of said first observation opening; a second observation opening in the lower face of said casing near the front face, said second observation opening having a lens whose axis is perpendicular to that of said first observation opening; a partially reflecting slide transversing the intersection of said two axes; a mirror housed inside said casing near the junction of the front face, the upper face of said mirror being inclined at 45° relative to said second axis; a television camera housed in the casing near the junction of the upper face with the back face, the axis of said television camera being perpendicular to said second axis and meeting with the latter at said mirror; and the inner faces of the casing being black.

7. Television apparatus comprising: a parallelepiped-like casing having a front face provided with a first observation opening near its junction with an upper face; a cathode-ray tube inside said casing near its back face, said cathode-ray tube having an axis substantially coinciding with the axis of said first opening; a second observation opening on the lower face near its junction with the front face, a lens in said second opening of said lens having an axis perpendicular to the axis of the first opening; a partially reflecting slide transversing the intersection of the axis of said first opening with the axis of said lens, said partially reflecting slide being inclined at 45° relative to said two axes; a reflecting mirror between said semi-reflecting slide and said lens, said reflecting mirror being adapted to assume a first position parallel to said partially reflecting slide and to assume a second position perpendicular to said partially reflecting slide; a television camera inside said casing and near its back face, the axis of said television camera transversing the intersection of said reflecting mirror with the axis of the lens, said intersection being the axis of rotation of said reflecting mirror when shifted from one position to another position; and the inner faces of said casing being black.

* * * * *